July 21, 1942.   T. B. ALLARDICE   2,290,664
SEPARATING APPARATUS
Filed June 13, 1940
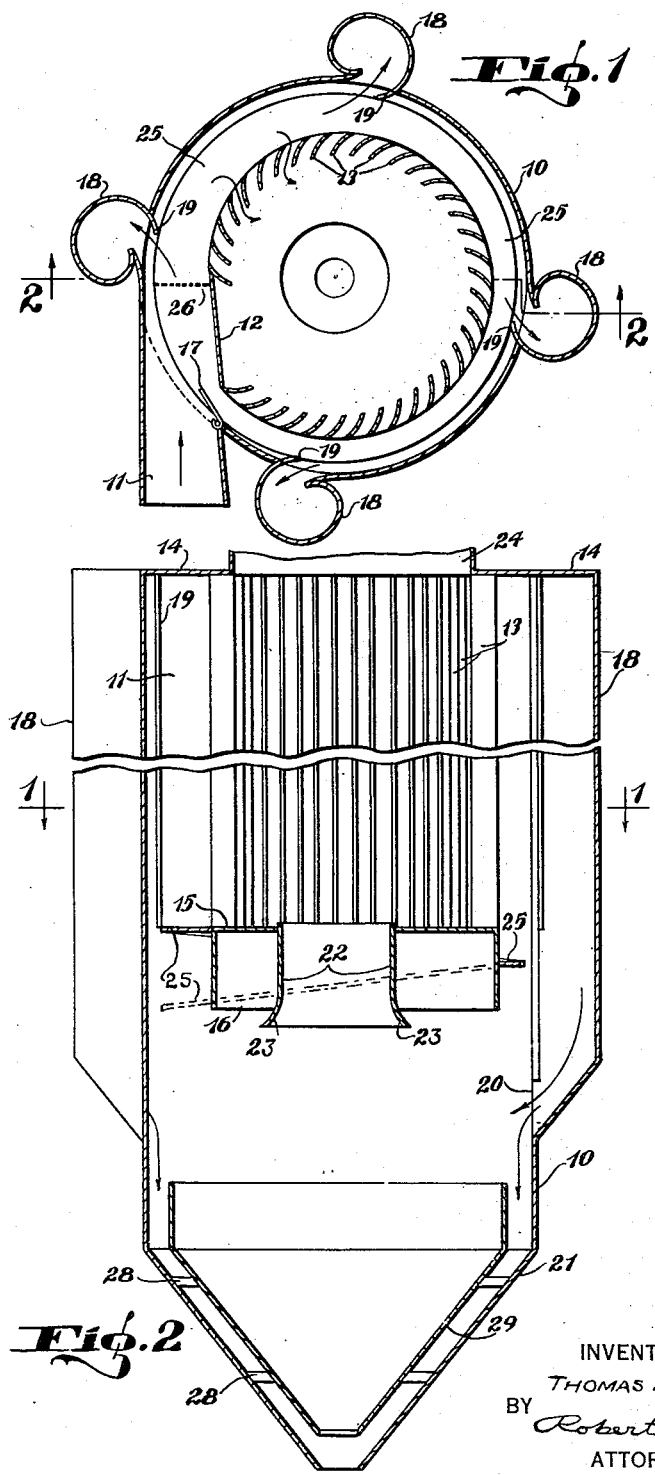
INVENTOR
THOMAS B. ALLARDICE
BY
Robert J. Palmer
ATTORNEY Patented July 21, 1942

2,290,664

UNITED STATES PATENT OFFICE 2,290,664

SEPARATING APPARATUS

Thomas B. Allardice, Mountain Lakes, N. J.

Application June 13, 1940, Serial No. 340,297

5 Claims. (Cl. 183—87)

This invention relates to apparatus for separating solid particles from gases and relates more particularly to apparatus for separating solid particles from flue gases from, for example, steam power plants.

The present invention is a modification of and in some respects is an improvement of that disclosed and claimed in my Patent No. 2,182,862, which issued Dec. 12, 1939.

In the separating apparatus of my said patent, and as illustrated more particularly by Figs. 1 to 3 inclusive of the drawing thereof, the dust laden gases enter a cylindrical casing through a tangential inlet and are caused to flow as a stream having a path of gradually diminishing area, gas being continuously separated from the stream and caused abruptly to change its direction at the points of separation to free it from the dust particles carried thereby. The said flow path terminates at its narrowest portion in a passage which conveyed the gas from the separating chamber. The present invention differs from the embodiment of my said patent by providing as one feature, for recirculating the gas through the separating chamber, the degree of recirculation being controlled by a damper. This results in a larger recovery of solid particles from the gas.

Another feature of this invention resides in providing one or more chambers at the periphery of the flow path with skimmers extending into the flow path for removing the larger solid particles thrown out by centrifugal force.

Another feature of this invention resides in providing the floor of the separating chamber in a spiral communicating with the hopper underneath for providing for the disposal of the solid particles which fall out of the gas upon the floor.

Another feature of the invention resides in providing in a converging lower hopper beneath the separating chamber, an inner chamber having its walls spaced from the walls of the hopper for separating the heavier solid particles falling adjacent the periphery of the hopper, and the lighter particles falling in the center of the hopper. This aids in maintaining spiral flow, without eddies, in the hopper.

The object of the invention is to increase the efficiency of separation of solid particles from gases.

The invention will now be described with reference to the drawing, of which:

Fig. 1 is a horizontal section through one embodiment of a separator according to this invention and is taken along the lines 1—1 of Fig. 2, and Fig. 2 is a vertical section along the lines 2—2 of Fig. 1.

The casing 10 has the tangential inlet 11 and has a curved inner wall formed by the plate 12 and the plurality of spaced baffle plates 13. This curved wall is spaced from the walls of the casing 10 to form a gas passage which progressively decreases in width from the tangential inlet to its narrowed point adjacent the inlet where the pivoted adjustable damper 17 is located. The damper 17 extends across the flow path at its narrowed point and serves to vary the volume of gas recirculated through the flow path. The inlet 11 extends from the upper wall 14 to the lower wall 15 and the damper 17 extends the same distance.

The whirl chambers 18 are formed on the exterior of the casing 10 and have the lips 19 which extend into the gas flow path to skim off the heavier solid particles which are thrown off by centrifugal force against the inner walls of the casing. The chambers 18 extend from the upper wall 14 of the casing below the plates 13, to the inlets 20 between the cylinder 16 and the hopper 21. One or more of the chambers 18 may be provided.

The cylinder 16 has in its interior and mounted coaxially therewith, the air guiding cylinder 22 with lower flared walls 23. The open upper end of the cylinder 22 extends through the upper wall 15 of the cylinder 16 through a circular aperture therein. The cylinder 22 serves as will be explained, to guide the gas from below the plates 13 into the central space between the plates for discharge with the air entering the said central space between the plates 13, into the outlet connection 24.

The plate 25 extends spirally around the cylinder 16, beginning in the inlet 11 and terminating at the other side of the flow path at 26 and serves as a spiral floor for conveying those heavy solid particles which fall thereon from the gas, in spiral flow to be discharged into the hopper 21. The passage 30 spaces the plate 25 from the inner walls of the casing 10 and provides a gas passage past the plate.

The hopper 21 in the illustrated embodiment is conical and has spaced from its inner walls and supported therefrom by the brackets 28, the inner hopper 29 having walls parallel to and spaced from the inner walls of the outer hopper. The heavier solid particles from the inlets 20 of the whirl chambers 18 fall into the hopper 21 in the space between the walls of the inner and outer hopper and are prevented from entering the interior of the inner hopper to interfere with the desired spiral flow of the lighter particles.

The apparatus described in the foregoing may be operated by connecting the suction side of a fan to the connection 24 at a convenient point and by connecting the inlet 11 to a gas source, the gas from which it is desired to clean. The gas then flows in the curved path of narrowing width between the inner walls of the casing 10 and the curved inner wall formed by the plate 12 and the baffle plates 13, and the heaviest solid particles are thrown out against the inner wall of casing 10 and are skimmed off by the lips 19 of the chambers 18 and fall through the chambers 18 and out the outlets 20 into the hopper 21.

At each plate 13 a portion of the gas has its direction abruptly changed to flow between adjacent plates under the influence of the suction in the passage between the plates, and these changes in direction cause the solid particles remaining in the gas to be thrown out and to fall upon the spiral plate 25 from which due to the whirling action and the downwardly extending angle of inclination of the plate, they are whirled off the plate 25 into the hopper 21.

By adjusting the damper 17 towards open position, recirculation of some of the gas is permitted and increased recovery is obtained by recirculating the gas again through the separating passages. The damper 17 is preferably adjusted to a position which observations show result in maximum efficiency of collection for a particular installation, and its most efficient position depends upon the degree of concentration of solid particles, the fineness of the particles, the size of the fan, the resistance to the gas flow and possibly other factors peculiar to individual installation.

The gas from the outlet 20 and any other gas entering the space between the hopper and the cylinder 16 passes through the inner cylinder 22 into the space at the interior of the curved wall formed by the baffle plates 13 and the plate 12, and then out the connection 24, together with the gas passing between the plates 13, as clean gas.

While the several features of this invention have been described and illustrated by the drawing, each feature has its individual advantage which may independently be utilized. The invention is not therefore to be interpreted as limited to the inclusion of all of said features.

While one embodiment has been described for the purpose of illutration, it should be understood that the invention is not limited to the exact apparatus and arrangement of apparatus illustrated as modifications thereof may be suggested by those skilled in the art without departure from the essence of the invention.

What is claimed is:

1. Apparatus for separating solid particles from gas, comprising a casing having an inlet and an outlet and arranged to provide a curved flow path for the gas entering said inlet, a plurality of spaced baffle plates around the inner periphery of said path and so arranged with respect to said casing that said path has progressively diminishing flow area, said plates being so disposed that portions of the gas flowing through said path are separated and caused abruptly to change their direction of flow to pass to said outlet, said path at its narrowest portion connecting with said inlet whereby a portion of said gas may be recirculated through said path, a damper in said narrowest portion for varying the volume of recirculated gas, and a hopper below said path and connecting with same for receiving the solid particles separated from said gas.

2. Apparatus for separating solid particles from gas, comprising a casing having a tangential inlet and an outlet and arranged to provide a curved flow path for the gas entering said inlet, a plurality of spaced baffle plates around the inner periphery of said path, said plates being so disposed that portions of the gas flowing through said path are separated and caused abruptly to change their direction of flow to pass to said outlet, said path connecting with said inlet whereby a portion of said gas may be recirculated through said path, a damper in said path adjacent its connection with said inlet for varying the volume of recirculated gas, and a hopper below said path and connecting with same for receiving the solid particles separated from said gas.

3. Apparatus for separating solid particles from gas, comprising a casing having an inlet and an outlet and arranged to provide a curved flow path for the gas entering said inlet, a plurality of spaced baffle plates around the inner periphery of said path and so arranged with respect to said casing that said path has progressively diminishing flow area, said plates being so disposed that portions of the gas flowing through said path are separated and caused abruptly to change their direction of flow to pass to said outlet, said path at its narrowest portion connecting with said inlet whereby a portion of said gas may be recirculated through said path, a damper in said narrowest portion for varying the volume of recirculated gas, a hopper below said plates, said casing having an opening therein alongside said plates at the outer periphery of said flow path for receiving solid particles thrown out of said gas, and means forming a chamber enclosing said opening and communicating with said hopper below said plates for guiding solid particles from said opening into said hopper.

4. Apparatus for separating solid particles from gas, comprising a casing having a tangential inlet and an outlet and arranged to provide a curved flow path for the gas entering said inlet, a plurality of spaced baffle plates around the inner periphery of said path and so arranged with respect to said casing that said path has progressively diminishing flow area, said outlet extending substantially axially of said curved flow path, said plates being so disposed that portions of the gas flowing through said path are separated and caused abruptly to change their direction of flow to pass to said outlet, said path at its narrowest portion connecting with said inlet whereby a portion of said gas may be recirculated through said path, a damper in said narrowest portion for varying the volume of recirculated gas, a hopper below said plates, means forming a skimmer extending into the outer periphery of said flow path for skimming off the heavier solid particles thereat, and means including said skimmer and forming a chamber for communicating with said hopper below said plates for conducting the skimmed off particles into said hopper.

5. Apparatus for separating solid particles from gas, comprising a casing having a tangential inlet and an outlet and arranged to provide a curved flow path for the gas entering said inlet, a plurality of spaced baffle plates around the inner periphery of said path and so arranged with respect to said casing that said path has progressively diminishing flow area, said outlet extending substantially axially of said curved flow path, said plates being so disposed that portions of the gas flowing through said path are separated and caused abruptly to change their direction of flow to pass to said outlet, said path at its narrowest portion connecting with said inlet whereby a portion of said gas may be recirculated through said path, a damper in said narrowest portion for varying the volume of recirculated gas, and means forming a partition between said plates and said hopper, said partition having an opening in alignment with said outlet for the passage of gas from the lower portion of said casing into said outlet.

THOMAS B. ALLARDICE.